(12) United States Patent
Swaminathan

(10) Patent No.: US 12,333,651 B2
(45) Date of Patent: Jun. 17, 2025

(54) OBJECT SIMULATION

(71) Applicant: Intrinsic Innovation LLC, Mountain View, CA (US)

(72) Inventor: Sivaramakrishnan Swaminathan, Mountain View, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 319 days.

(21) Appl. No.: 18/109,053

(22) Filed: Feb. 13, 2023

(65) Prior Publication Data

US 2023/0260214 A1 Aug. 17, 2023

Related U.S. Application Data

(60) Provisional application No. 63/309,129, filed on Feb. 11, 2022.

(51) Int. Cl.
*G06T 17/20* (2006.01)
*G06T 13/40* (2011.01)

(52) U.S. Cl.
CPC .............. *G06T 17/20* (2013.01); *G06T 13/40* (2013.01)

(58) Field of Classification Search
CPC ................................ G06T 17/20; G06T 13/40

USPC .......................................................... 345/420
See application file for complete search history.

(56) References Cited

U.S. PATENT DOCUMENTS

| | | | | |
|---|---|---|---|---|
| 2019/0221034 A1* | 7/2019 | Mason | .................... | G06T 15/08 |
| 2020/0134831 A1* | 4/2020 | Chen | ..................... | G06N 3/08 |
| 2020/0211698 A1* | 7/2020 | Douglas | ................. | G16H 50/50 |
| 2020/0327418 A1* | 10/2020 | Lyons | ..................... | G06N 3/126 |
| 2022/0215564 A1* | 7/2022 | Sunarjo | .................... | G06T 19/20 |

OTHER PUBLICATIONS

U.S. Appl. No. 17/375,331, filed Jul. 14, 2021, Eyjolfsdottir et al.
U.S. Appl. No. 17/375,356, filed Jul. 14, 2021, Eyjolfsdottir et al.

* cited by examiner

*Primary Examiner* — Thomas J Lett
(74) *Attorney, Agent, or Firm* — Fish & Richardson P.C.

(57) ABSTRACT

Methods, systems, and apparatus, including computer programs encoded on computer storage media, for object simulation. One of the methods includes generating a mesh representation of a deformable object and generating, from the mesh representation of the deformable object, a structural representation of the deformable object. A plurality of simulated instances of the object are generated based on kinematics of the structural representation of the deformable object.

20 Claims, 11 Drawing Sheets

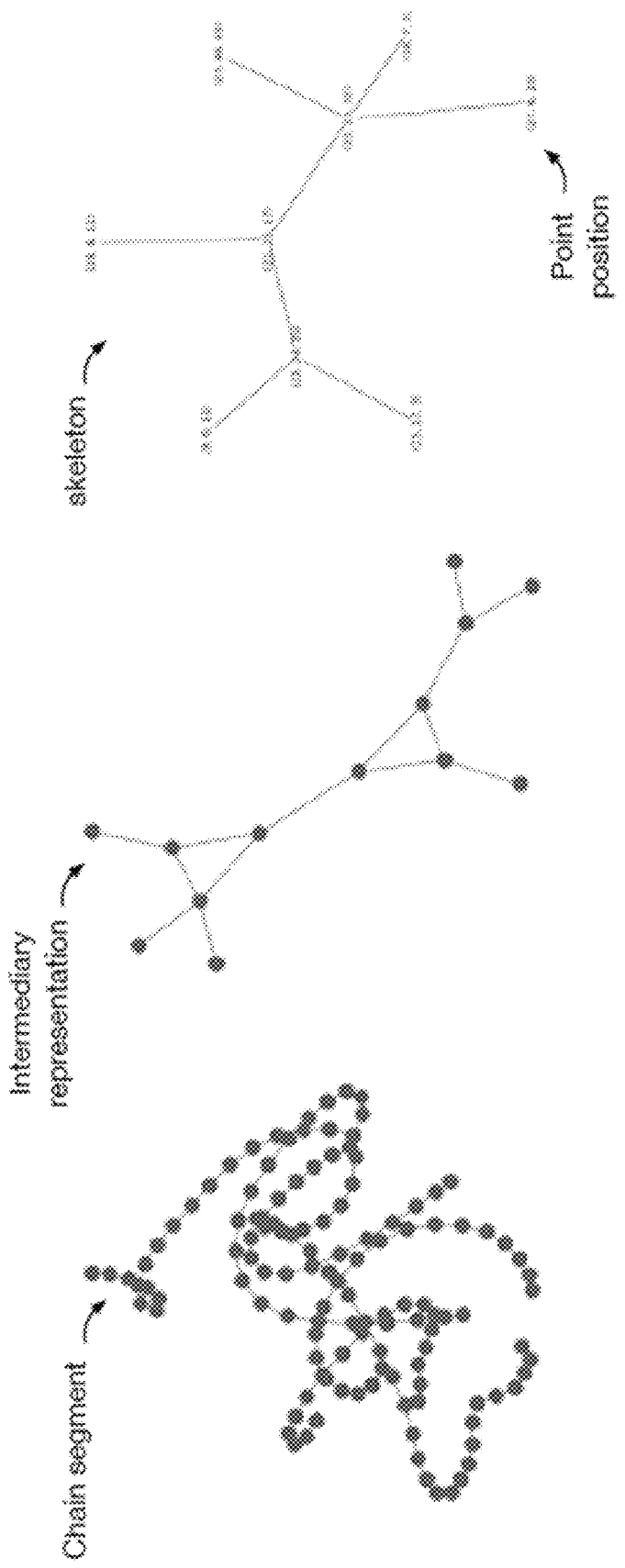

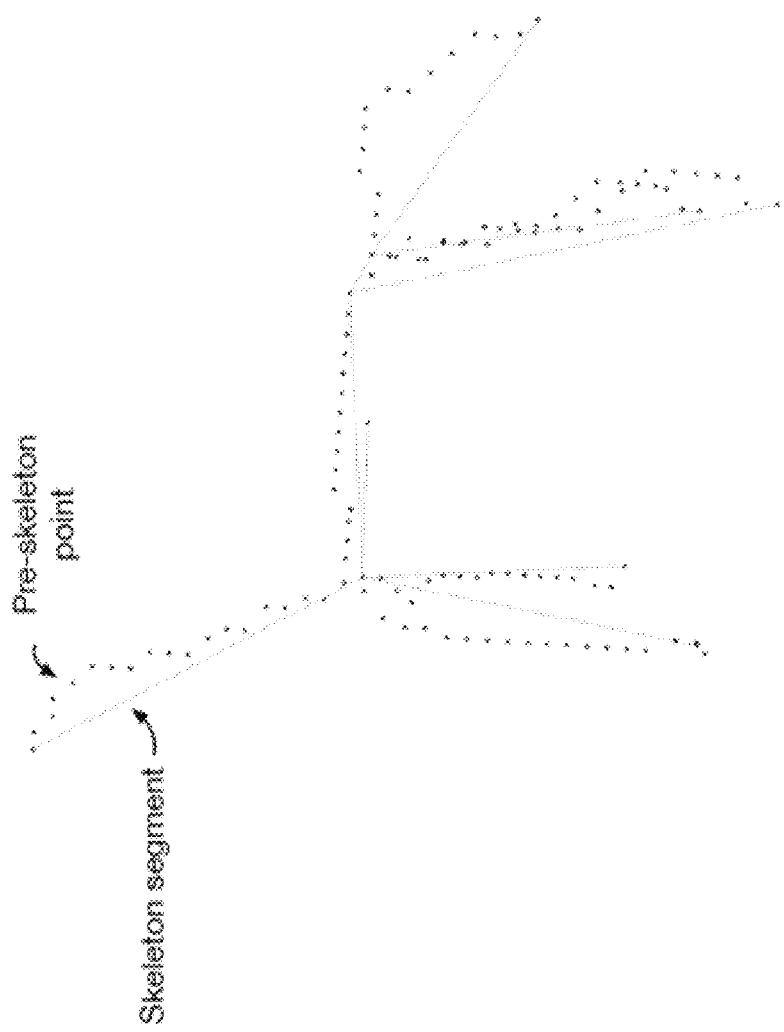

OBJECT SIMULATION

CROSS-REFERENCE TO RELATED APPLICATIONS

This application claims the benefit under 35 U.S.C. § 119(e) of the filing date of U.S. Provisional Patent Application No. 63/309,129, filed on Feb. 11, 2022, entitled "System and Method for Object Simulation," the entirety of which is herein incorporated by reference.

TECHNICAL FIELD

This invention relates generally to the object simulation field, and more specifically to a new and useful system and method in the object simulation field.

BRIEF DESCRIPTION OF THE FIGURES

FIGS. 6A-6D are illustrative examples of generating a skeleton from the pre-skeleton.

FIG. 7 is an illustrative example of segmenting a mesh representation where different colors illustrate different bones that the vertices are associated with.

Like reference numbers and designations in the various drawings indicate like elements.

DETAILED DESCRIPTION

This specification describes how a system can automatically and more efficiently generate simulated training data for deformable objects that are partially rigid.

The following description of embodiments of the invention is not intended to limit the invention to these embodiments, but rather to enable any person skilled in the art to make and use this invention.

1. Overview

Figure 1:
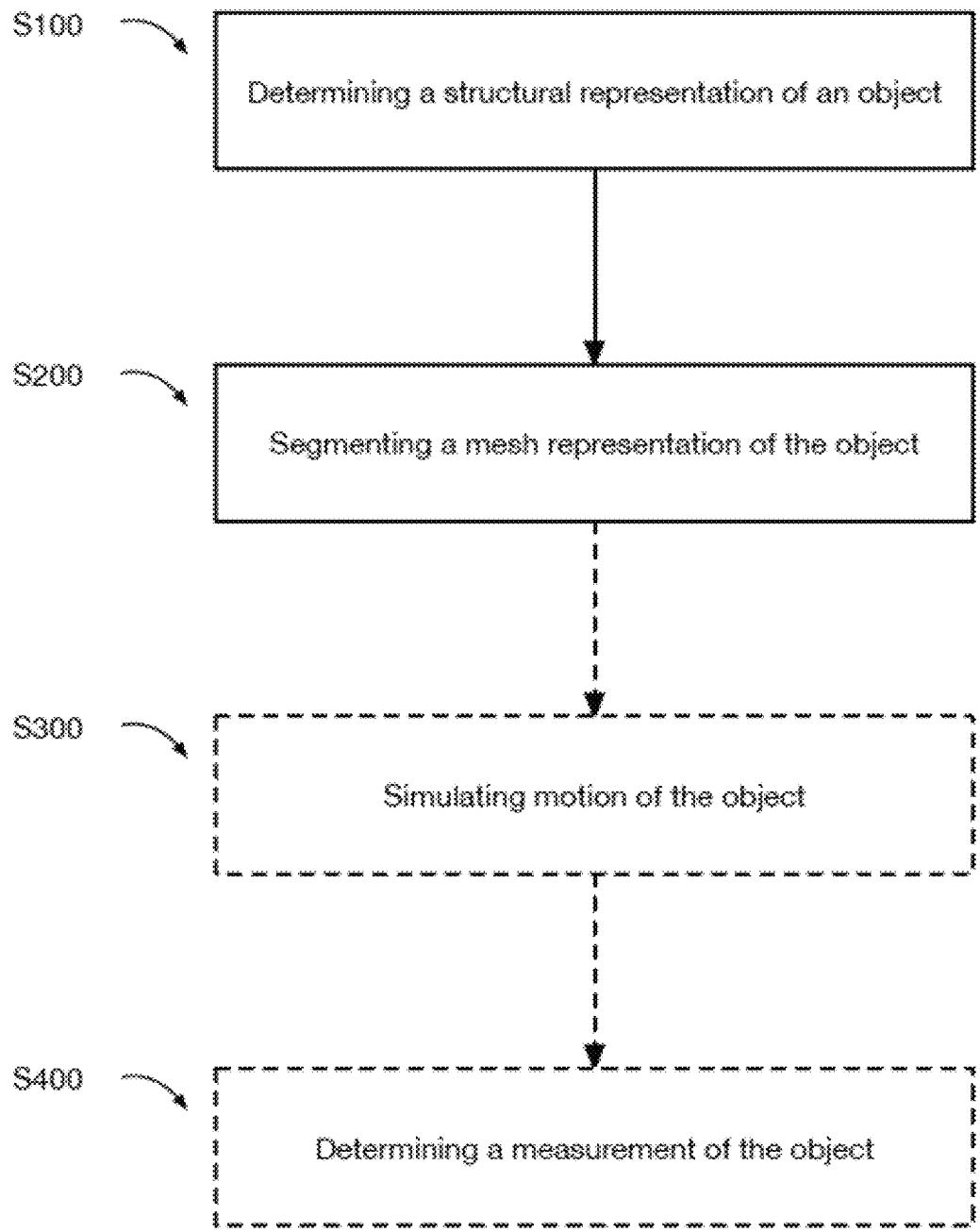
FIG. 1 is a flowchart representation of the method.

As shown in FIG. 1, the method for object simulation can include: determining a structural representation of an object S100, segmenting a mesh representation of the object S200, optionally simulating motion of the object S300, and optionally determining a measurement of the object S400. The method functions to skeletonize an object (e.g., a deformable or flexible object), which enables the technology to generate more accurate object pose simulations (e.g., for training data generation). However, the method can additionally and/or alternatively include any other suitable elements.

In an illustrative example, the method can include: sampling measurements (e.g., images) of an object; generating a mesh from the measurements; skeletonizing the mesh to generate a structural representation of the object (e.g., a skeleton) formed from a set of joined 2D segments; segmenting the mesh based on the segments (e.g., assigning weights to each vertex for neighboring segments based on the respective distances, etc.) modelling the kinematics of one or more instances of the object based on the structural representation and the mesh (e.g., a collision volume determined based on the mesh) using a physics simulator, where mesh vertex motion can be constrained based on the respective segment associations; optionally coloring and/or texturizing the simulated object instances; sampling a set of synthetic images of the simulated object instances; and/or training a model using the set of synthetic images. In variants, the structural representation can be graph-based, where points can represent joints and edges can represent bones (e.g., substantially rigid object segments).

In examples, skeletonizing the mesh can include: voxelizing the mesh (e.g., converting a mesh to voxels that cooperatively fill all or most the interior volume of the object); eroding the voxels, starting with the outmost layer, to determine a set of spatial points (e.g., a first pre-skeleton representation); iteratively consolidating the points, including: connecting neighboring points within a threshold distance with edges (e.g., to generate a second pre-skeleton representation), removing intermediary points (e.g., points having exactly two neighboring points) from the second pre-skeleton representation to generate a third pre-skeleton representation, consolidating point clusters into single points (e.g., a highly connected points, points having more than a predetermined number of edges, points separated by less than a threshold distance, etc.), and/or otherwise consolidating the points; optionally segmenting the resultant structural representation (e.g., skeleton) to define additional joints (e.g., points) using heuristics, based on the mesh; and/or otherwise skeletonizing the mesh.

Segmenting the mesh can include: assigning weights for each vertex of the mesh to each bone based on a distance between the vertex and the bone; and optionally determining collision volumes based on the mesh; wherein vertex movement can be constrained based on the bone poses, according to the respective weights, and/or based on the collision volumes.

2. Technical Advantages

The system and method for object simulation can confer several benefits over conventional methods.

First, variants of the technology enable automated deformable object modeling from a limited set of measured object poses (e.g., measurements of a single pose, or measurements of antipodal poses) with limited or no a priori object segment or joint knowledge. Conventionally, flexible objects are difficult and computationally expensive to model, especially when the object segments and joints are not known a priori, and/or when measurements from a limited number of object poses are available. Current methods overcome these challenges by requiring manual indication of the object's degrees of freedom (e.g., a manually-created virtual model), and/or require measurements of the physical object in a wide range of different poses. In examples, the technology can overcome these challenges by: generating a complete mesh of the object from the limited pose measurements; skeletonizing the complete mesh; and modeling the kinematics of object motion using both the skeleton and complete mesh.

Second, variants of the technology can create an interpolated segmentation of the object using the skeletonization. The inventors have discovered that, in some instances, merely associating each mesh vertices with a virtual "bone" of the skeleton is insufficient—when simulating motion, the vertices will strictly move with the assigned bones, resulting in a ripped mesh. The inventors have discovered that this can be prevented by intelligently associating vertices with multiple bones (e.g., using interpolation).

Third, variants of the technology can rapidly generate skeletonized representations of unknown objects by: using heuristics to consolidate the large number of candidate joints (e.g., points) generated from mesh erosion, approximating collision volumes as prisms (e.g., cylinders), and/or otherwise decreasing the computational time. This can enable skeletonized object representations to be generated and used in real- or near-real time.

However, the system and method can confer any other suitable benefits.

3. Method

The method can include: determining a structural representation of an object S100, segmenting a mesh representation of the object S200, optionally simulating motion of the object S300, optionally determining a measurement of the object S400, and/or any other suitable elements.

The method functions to rapidly generate segmented deformable object models, which enables simulation of images of piles of an object. All or portions of the method can be performed once, iteratively, repeatedly (e.g., for different objects, for different time frames), periodically, and/or otherwise performed. All or portions of the method can be performed by: a remote system (e.g., a platform), a local system, and/or any other suitable computing system.

The object can be one object, multiple objects, and/or any other suitable number of objects. The object is preferably deformable and/or partially rigid with movable joints, but can additionally and/or alternatively be fully rigid and/or have any other suitable structural property. The object appearance can be: matte, transparent, translucent, reflective, and/or have any other suitable property. Examples of objects can include: a toy (e.g., action toy figure, stuffed animal, etc.), a mannequin, a crash test dummy, a human, an animal, a robot, and/or any other suitable object.

3.1. Determining a Structural Representation of an Object S100

Determining a structural representation of an object S100 functions to determine a skeletal, virtual representation of a physical object. The structural representation preferably represents a skeleton of the object (e.g., rigid framework supporting an object), but can additionally and/or alternatively represent an interior of the object (e.g., interior volume), an exterior of the object (e.g., exterior surface), and/or any other suitable object component.

The structural representation (e.g., skeleton) can be a tree or graph (e.g., points connected by non-directed edges, a set of joined 2D segments, etc.), but can additionally and/or alternatively be a table, a matrix, a set of clusters, and/or any other suitable representation. The edges of the graph are preferably straight lines, but can additionally or alternatively be curves, be serpentine, or have any other configuration.

The edges are preferably treated as rigid, but can alternatively be treated as flexible, wherein the deflection, flexibility, and/or elasticity of the edge can be determined based on the object's appearance (e.g., proximal the edge), be predetermined, be manually determined, or be otherwise determined. The points are preferably treated as joints, but can be otherwise treated. The joints can be classified into one or more predetermined classes (e.g., based on the number of edges connected to the joint), or be unclassified. One or more degrees of freedom (DOF) of each joint can be: unconstrained, partially constrained, fully constrained, and/or otherwise constrained. The DOF constraints can be predetermined (e.g., based on the joint class), manually determined, automatically determined (e.g., based on the mesh volume), and/or otherwise determined.

The structural representation is preferably determined from a mesh of the object, but can alternatively be determined from a geometric model of the object (e.g., CAD), images of the object, a point cloud, and/or any other geometric representation of the physical object.

The geometric representation is preferably scaled, but can alternatively be unscaled. The mesh can be retrieved from a database, manually determined, automatically generated using an algorithm (e.g., such as the methods disclosed in U.S. application Ser. No. 17/375,331 filed on 14 Jul. 2021 and/or U.S. application Ser. No. 17/375,356 filed on 14 Jul. 2021, each of which are incorporated in their entireties by this reference), and/or otherwise determined. The mesh can be determined using measurements of the physical object taken from a limited number of poses (e.g., a single pose, two poses, antipodal poses, etc.) and/or otherwise determined. The measurements can be sampled from: one perspective, two perspectives (e.g., antipodal perspectives), and/or any other suitable number of perspectives. The mesh can include: vertices, cells, edges, faces, and/or any other suitable mesh anatomy. Each vertex and/or cell is preferably associated with a visual characteristic (e.g., color, texture, etc.), but can alternatively not be associated with a visual characteristic.

The structural representation's position relative to the mesh is preferably known (e.g., tracked during skeleton generation), but can alternatively be unknown. In the latter variant, the skeleton can be repositioned within the mesh after skeleton generation based on a heuristic (e.g., centering the skeleton within volume defined by the mesh), a reference point (e.g., a known position of a joint relative to the mesh), and/or otherwise repositioned.

Figure 2:
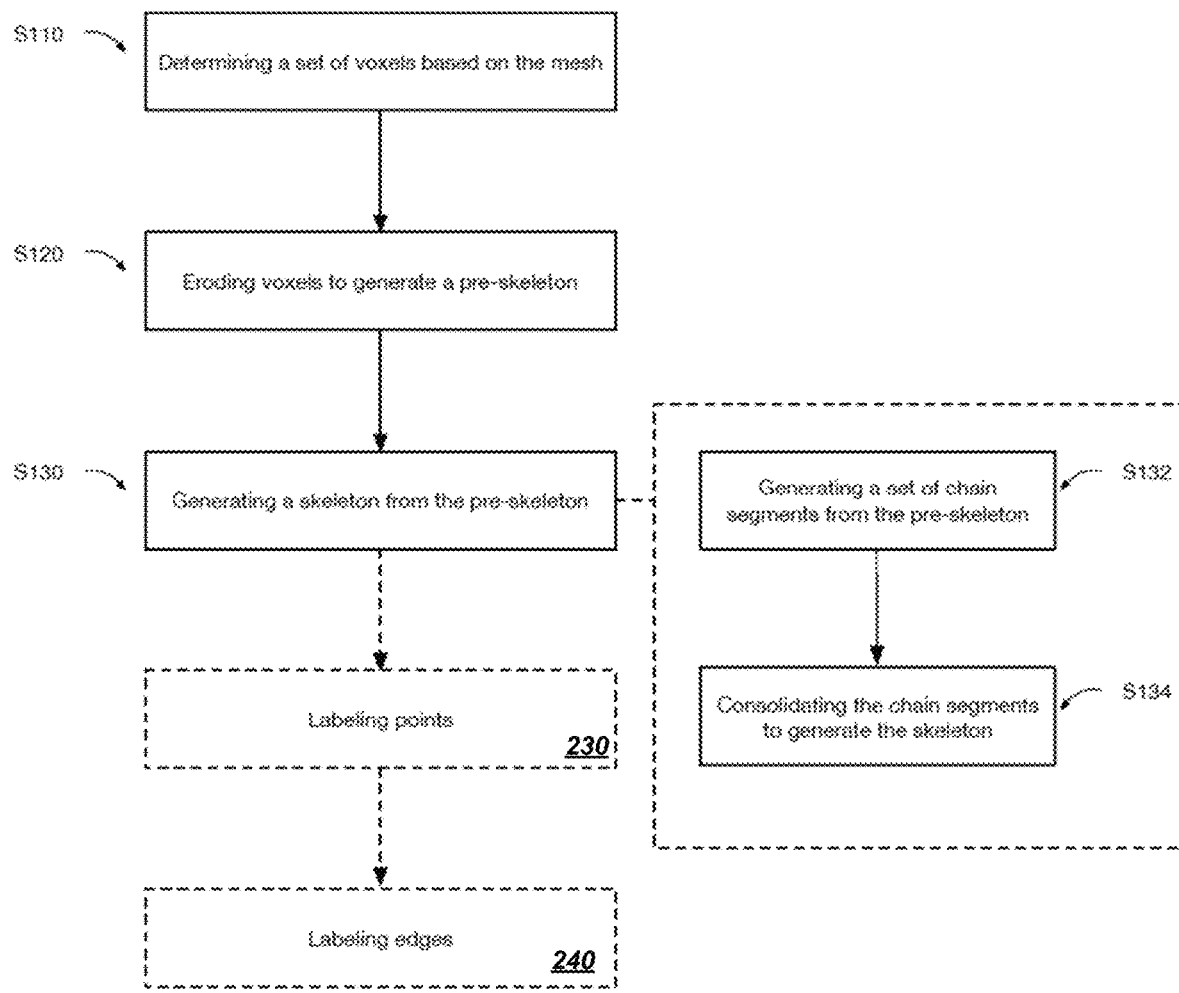
FIG. 2 is a flowchart representation of a variant of determining a structural representation.

As shown in FIG. 2, S100 can include: determining a set of voxels based on the mesh S110, eroding voxels to generate a pre-skeleton S120, generating a skeleton from the pre-skeleton S130, optionally labeling points, optionally labeling edges, and/or any other suitable element.

Figure 5:
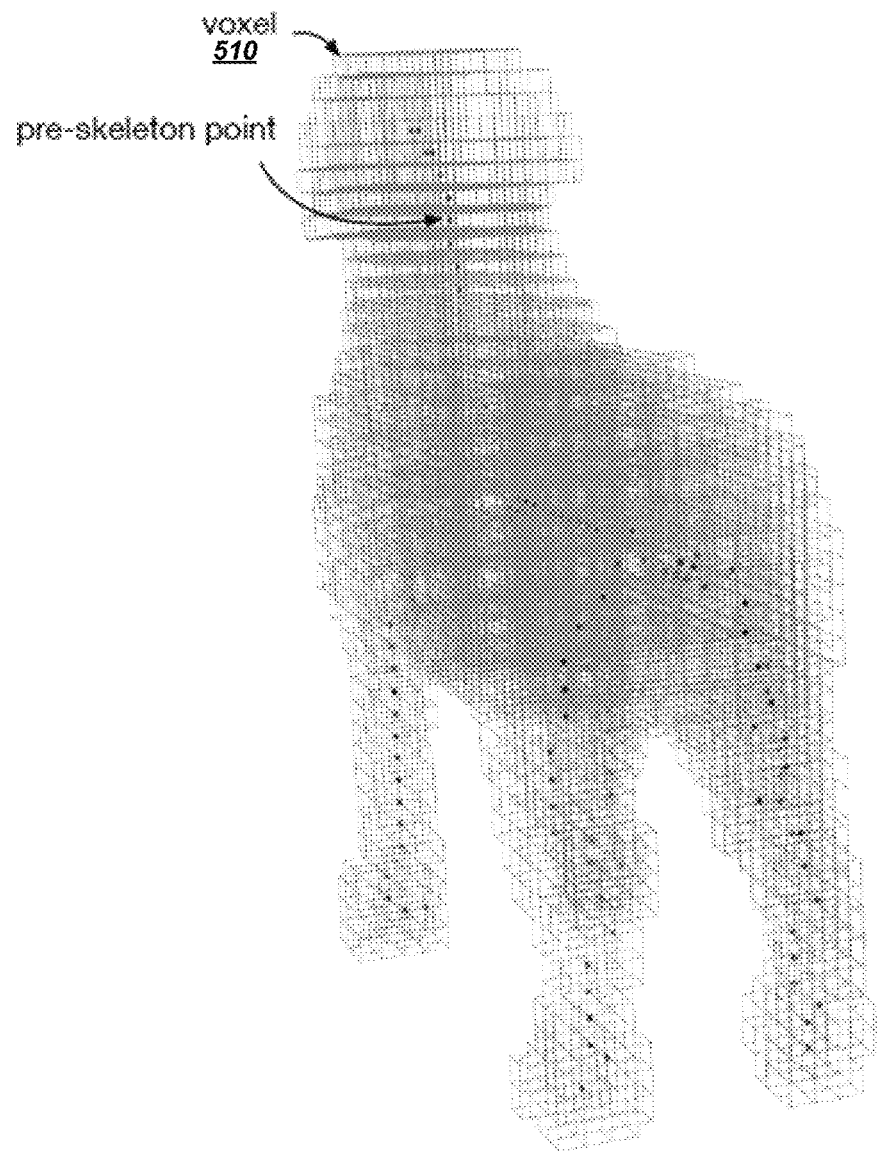
FIG. 5 is an illustrative example of determining a set of voxels.

In S110, the set of voxels preferably fully encompasses a volume enclosed by the mesh (example shown in FIG. 5), but can alternatively partially encompass a volume enclosed by the mesh, not encompass a volume enclosed by the mesh, and/or any other suitable configuration. The set of voxels can be automatically determined using an algorithm, manually determined, and/or otherwise determined. In FIG. 5, a dog toy, an example of a deformable object that can be skeletonized, is represented using cubic voxels, e.g., voxel 510, that each occupy a particular volume of space so that the full volume of the mesh is within the voxels.

In S120, the pre-skeleton is preferably a set of non-connected points (example shown in FIG. 6D), but can additionally and/or alternatively be a set of connected points, a set of edges, a set of vectors, and/or any other suitable representation. The location of the pre-skeleton relative to the mesh is preferably known (e.g., tracked), but can alternatively be unknown. S120 is preferably performed iteratively (e.g., until a predetermined number of remaining points), but can additionally and/or alternatively be performed once, repeatedly (e.g., for a predetermined number of times), periodically, and/or otherwise performed. In an example, voxels are iteratively eroded layer by layer starting with the outmost layer until a set of points remains. In another example, S120 includes iteratively using a voxel thinning approach, wherein multiple voxels are removed for each iteration, until a set of points remains. Each iteration includes subcycles that differ in the direction the thinning is performed. However, the voxels can be otherwise eroded to generate a pre-skeleton.

In S130, generating a skeleton from the pre-skeleton S130 can include generating a set of chain segments from the pre-skeleton S132, consolidating the chain segments to generate the skeleton S134, and/or any other suitable element; examples shown in FIG. 6A, FIG. 6B, FIG. 6C, and FIG. 6D.

In FIG. 6A, points in the pre-skeleton have been joined together to form chain segments. In FIG. 6B, an intermediary representation has been generated that consolidates the points. In FIG. 6C, the final skeleton has point positions assigned. FIG. 6D illustrates the final skeleton compared to the initial set of pre-skeleton points.

In S132, generating a set of chain segments from the pre-skeleton S132 can include connecting neighboring pre-skeleton points (example shown in FIG. 6A), connecting pre-skeleton points within a threshold distance of each other, and/or otherwise connect the pre-skeleton points into a graph.

In S134, the skeleton can represent a set of bones, wherein each bone is represented by a chain segment from the pre-skeleton, and/or any other rigid framework. The chain segments can be consolidated into the skeleton S134 using heuristics, a set of rules, and/or be otherwise performed. In a first example, S134 can include removing intermediary points connecting two chain segments when a pruning condition is fulfilled (e.g., when the angle between the two chain segments is less than a predetermined threshold, when the angle between the two chain segments is greater than a predetermined threshold, when the point is connected to only two neighboring points, etc.). In a second example, S134 can include maintaining intermediary points connecting three or more chain segments. In a third example, S134 can include maintaining intermediary points with three or more neighboring points. In a fourth example, S134 can include collapsing clusters, cyclical chains, points separated by less than a threshold distance (e.g., joints separated by less than a threshold distance), or neighboring and highly connected points into a single point. However, S134 can be otherwise performed. S134 is preferably performed iteratively (e.g., until there are no more chain segments to prune), but can additionally and/or alternatively be performed repeatedly, periodically, and/or otherwise performed. However, the chain segments can be otherwise consolidated.

S100 can optionally include segmenting the chain segments to define additional joints (e.g., to obtain extra flexibility). In a first variant, chain segments can be segmented based on the type of object (e.g., a toy, a mannequin, etc.), which can be specified by a user, inferred from the visual properties and/or material, and/or otherwise determined. In a second variant, chain segments can be segmented using a predetermined heuristic. In a first example, chain segments that exceed a predetermined length are further segmented until all chain segments have the predetermined length. In a second example, each chain segment is segmented to a predetermined number of chain segments.

S100 can optionally include labeling points (230). In a first variant, the point can be labelled as a joint or a leaf. For example, a point connected to two or more other points is labelled as a joint, and a point connected one other point is labelled as a leaf. In a second variant, the point can be labelled as one of a set of predetermined joint classes. Examples of joint classes can include: ball and socket, saddle, hinge, condyloid, pivot, gliding, fully constrained, unconstrained, partially constrained, and/or any other class. The joint classes can be determined based on: the joint's location within the structural representation (e.g., distance from a leaf), the number of edges connected to the joint, and/or any other point characteristic. The joint classes can be determined using a set of heuristics, a neural network, and/or otherwise determined.

S100 can optionally include labeling edges (240) (e.g., chain segments) with an anatomic label (e.g., leg, neck, tail, etc.). The edge labels can be determined using a set of heuristics, a neural network, and/or otherwise determined.

However, the structural representation can be generated using mesh contraction, volumetric methods (e.g., voxel-thinning methods, distance field methods, etc.), geometric methods (e.g., using Voronoi diagrams, Reeb-graph-based methods, intersections of distances from boundary sections, etc.), using morphological operators, and/or other skeletonization methods.

However, the structural representation can be otherwise determined.

3.2. Segmenting a Mesh Representation of the Object S200

Segmenting a mesh representation of the object S200 functions to associate each unit of a geometric object representation with one or more bones (e.g., edge, segment).

The geometric representation is preferably a mesh, but can additionally and/or alternatively be polygons, point clouds, and/or any other suitable representation. The mesh can be the same mesh determined in S100, a different mesh, and/or any other suitable mesh.

The geometric representation unit is preferably a mesh vertex, but can additionally or alternatively be a point, a cell, and/or any other geometric representation unit. Each unit can be associated with one bone, multiple bones, and/or any other suitable number of bones. Each bone can be associated with one or more units (e.g., vertices). Bone associations can be determined for each individual units, a cluster of units (e.g., all vertices within a predetermined distance or patch), and/or any other set of units. The bone is preferably defined in the structural representation in S100, but can additionally and/or alternatively be defined in the mesh representation, and/or otherwise defined.

Figure 3:
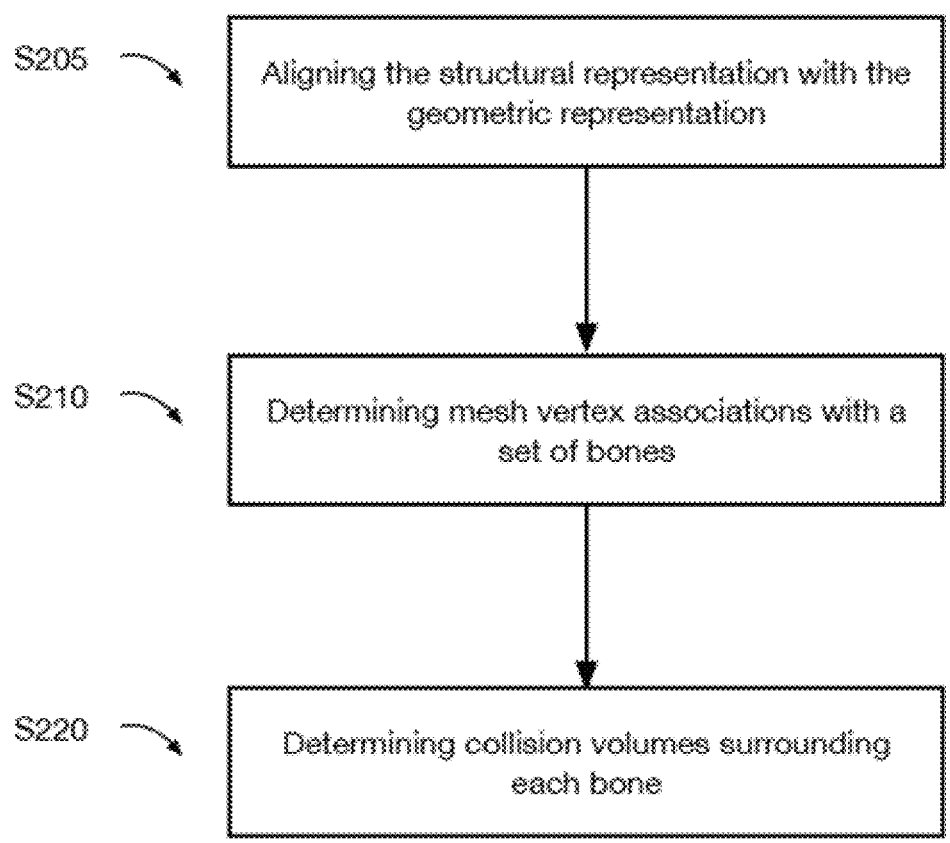
FIG. 3 is a flowchart representation of a variant of segmenting a mesh representation.

As shown in FIG. 3, S200 can include: aligning the structural representation with the geometric representation S205, determining mesh vertex associations with a set of bones S210, determining collision volumes surrounding each bone S220, and/or any other suitable element.

In S205, the structural representation (e.g., skeleton) can be aligned with the geometric representation (e.g., mesh) based on: the known relationship between the structural representation and the geometric representation (e.g., tracked through the skeleton-generation process); a set of heuristics (e.g., determining a skeleton position that is fully encompassed by the mesh, aligning a leaf point with a mesh extremity, etc.); known skeleton position relative to an external coordinate system; and/or be otherwise aligned.

In S210, each vertex can be associated with one bone, multiple bones, no bones, and/or any other suitable number of bones. Each bone can be associated with one vertex, multiple vertices, no vertices, and/or any other suitable number of vertices. Mesh vertex association with each bone can be determined automatically, manually, and/or otherwise determined.

In a first variant, S210 can include automatically associating each vertex of the mesh with one or more bones, based on the distance between the vertex and each bone of the set.

In a first embodiment, each vertex is assigned to closest (e.g., spatially) bone.

Figure 7:
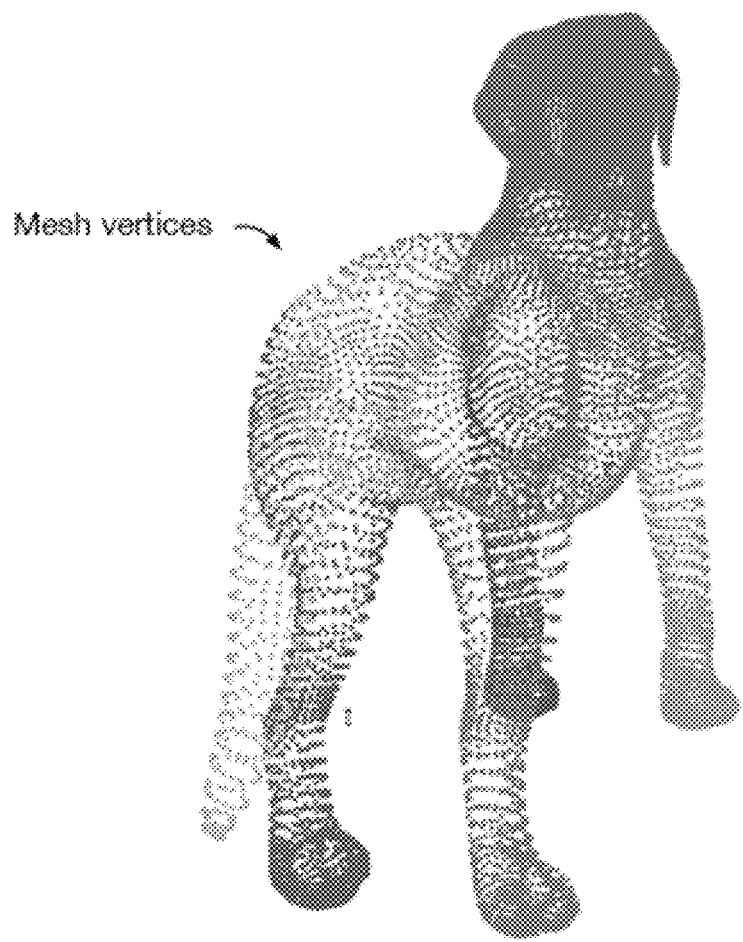

In a second embodiment, the mesh is segmented by the closest bone; example shown in FIG. 7.

In a third embodiment, each vertex is associated with a set of bones (e.g., neighboring bones, bones within a predetermined distance of the vertex, all bones, etc.). In this embodiment, the vertex can be assigned weights for each bone within the set, wherein the weights dictate how much the vertex should move with each bone and/or how the cells (e.g., of the mesh) should deform.

In a first example of the first variant, every vertex corresponds to a bone with weight 1 and weight 0 for all other bones. The weights between vertex pairs can optionally be blended (e.g., interpolated).

Figure 8:
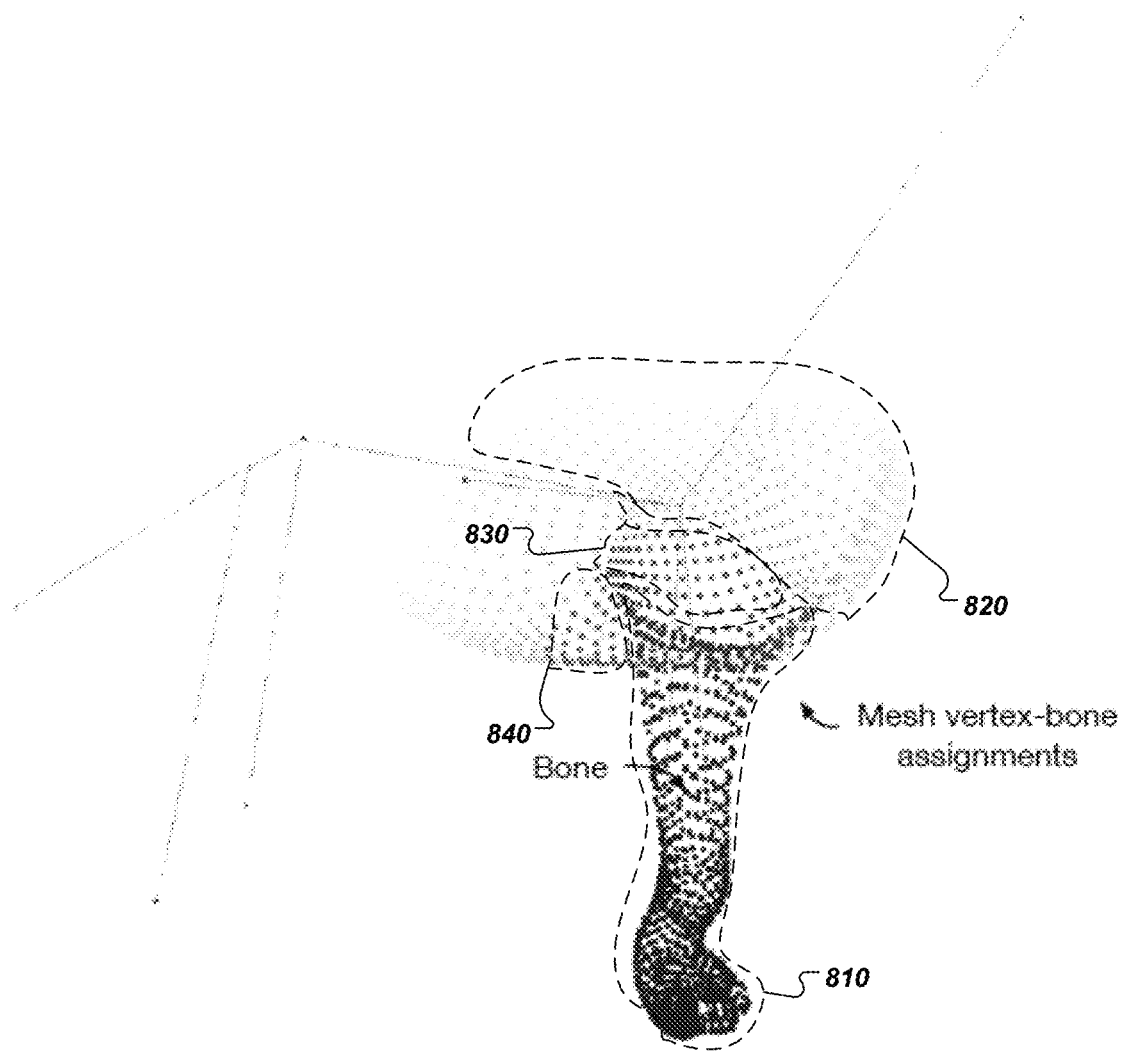
FIG. 8 is an illustrative example of blending weights of vertex pairs between bones, where different colors illustrate different weight.

In a second example of the first variant, some vertices correspond to a bone with a weight that is between 0 and 1 inclusive (e.g., 0.1, 0.5, 0.9, etc.); example shown in FIG. 8. In FIG. 8, vertexes in region 810 are assigned entirely to a leg bone, and vertexes in region 820 are assigned entirely to a neck bone. In contrast, vertexes in the regions 830 and 840 have weights that partially assign the vertexes to multiple bones. The inventors have discovered that blending a vertex's correspondence between bones can smooth out the mesh surface and therefore prevent tear and irregular behavior of the mesh during motion simulation.

In a third example of the first variant, a set of bones neighboring (e.g., based on a distance threshold) a vertex can be determined and weights are assigned to each bone of the set, wherein the resultant vertex pose can be based on the weighted poses of each bone. Each weight can be calculated based on the respective bone's distance to the vertex (e.g., wherein closer bones can have higher weights, and further bones can have lower weights), based on the vertex's position in the mesh, based on the adjacent mesh cell's elasticity, and/or calculated based on any other parameter. The weights can vary: linearly, exponentially, logarithmically, and/or otherwise vary based on the parameter value. The weights for a vertex preferably collectively sum to 1, but can be otherwise characterized or constrained. However, each vertex of the mesh with weights to one or more bones can be otherwise assigned. However, each vertex of the mesh can be otherwise automatically associated with one or more bones.

In a second variant, S210 can include randomly assigning each vertex of the mesh to a bone.

In a third variant, S210 can include associating each bone with one or more vertices of the mesh, based on vertex identifiers from which the bone was generated. For example, a voxel determined by the mesh is associated with the vertex identifiers for the voxel's closest vertices, and a pre-skeleton point inherits the vertex identifiers associated with the voxels from which the pre-skeleton point was generated. Chain segments can inherit the vertex identifiers for the chain segment's constituent pre-skeleton points. However, mesh vertex associated with each bone can be otherwise determined.

In S220, the collision volume surrounding each bone is preferably determined based on the mesh, but can additionally and/or alternatively be based on auxiliary data, the type of object, and/or any other suitable attribute.

Figure 9:
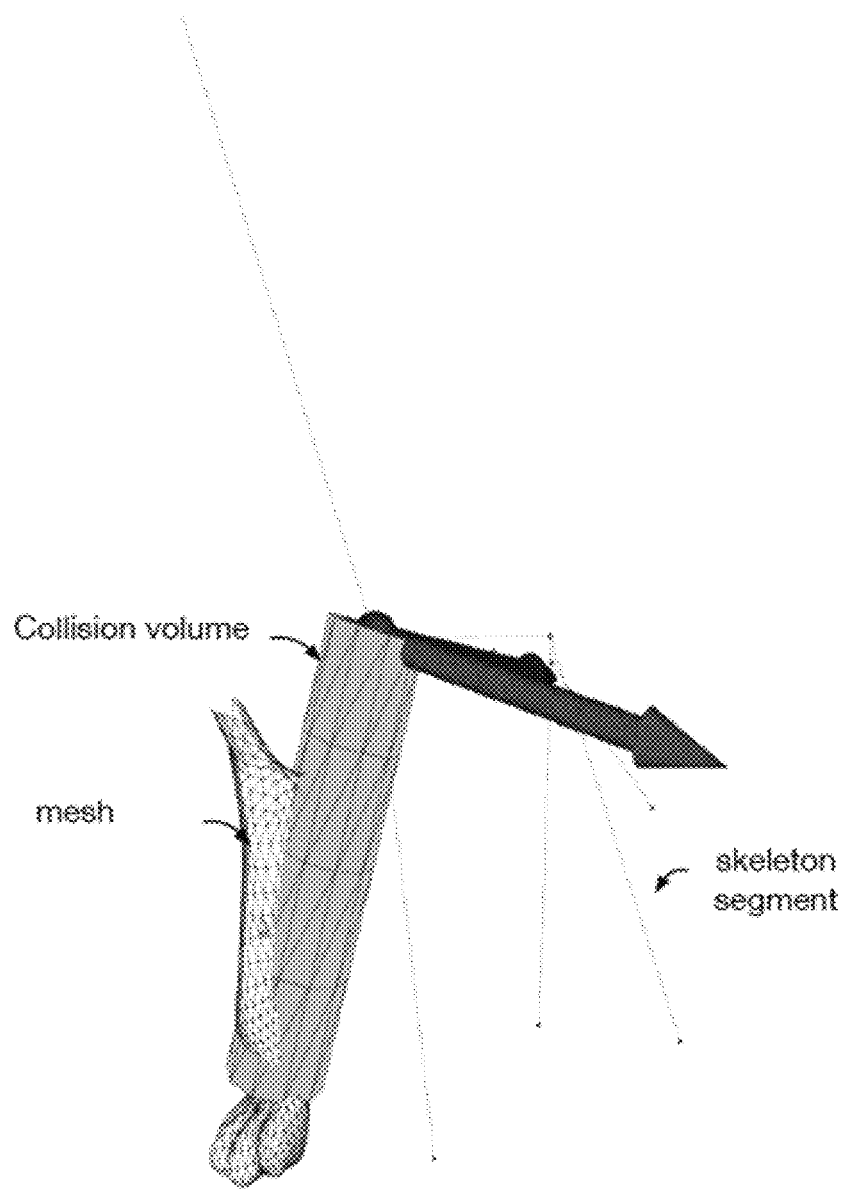
FIG. 9 is an illustrative example of determining collision volume surrounding a bone.

In a first variant, S220 can include approximating each object segment (e.g., a set of vertices associated with a bone) as a cylinder, prism, sphere, cone, cube, pyramid, and/or any other 3-dimensional shape (e.g., predefined shape) closest to the object segment's shape; example shown in FIG. 9.

In a second variant, S220 can include determining a volume that corresponds to each bone and adding a safety margin around the volume, such that volumes (e.g., "limbs") surrounding the bones and/or joints do not collide with each other.

In a third variant, S220 can include determining collision volume based on a median distance between each vertex and each bone (e.g., to simulate deformability of the object).

In a fourth variant, S220 can include determining collision volume based on safety margin around the mesh (e.g., growing the mesh).

In a fifth variant, S220 can include determining collision volume defined by the boundaries of the mesh.

However, the collision volume surrounding each bone can be otherwise determined.

However, the mesh representation can be otherwise segmented.

3.3. Optionally Simulating Motion of the Object S300

Simulating motion of the object S300 functions to determine a motion simulation of the object to be measured. S300 preferably uses the segmented mesh representation from S200 aligned with the structural representation from S100 in the simulation, but can alternatively only use the segmented mesh representation, only use the structural representation, and/or use any other object model in the simulation. The object can be one object, multiple objects, a pile of the same object (e.g., wherein S300 simulates dropping each object onto the pile), a pile of different objects, and/or any other suitable number and/or arrangement of objects. For example, S300 can include using a physics simulator retrieved from a database. The physics simulator can include encoded constraints (e.g., a specific joint cannot open at an angle more than 90 degrees, bones are treated as rigid, mesh cells cannot stretch more than a threshold distance, etc.), account for constraints assigned to certain joint classes or edge classes, not account for constraints, and/or otherwise account for constraints. Every vertex on the mesh surface can move independently of other vertices, but are constrained by the distance to their associated bones (e.g., move with the associated bones); example shown in FIG. 10.

Figure 10:
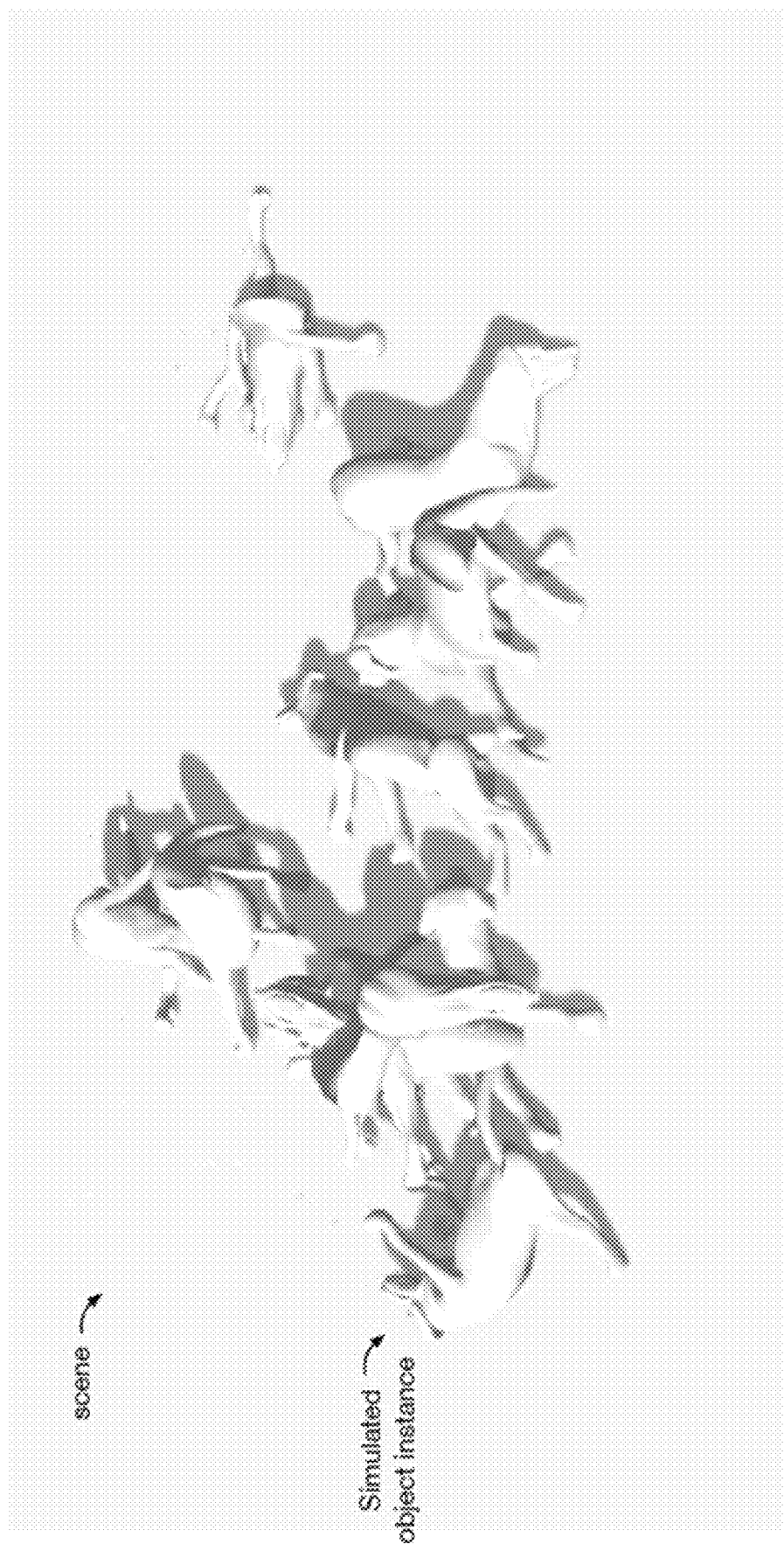
FIG. 10 is an illustrative example of simulating motion of a pile of the same object.

FIG. 10 illustrates the object motions that can be simulated using the techniques described in this specification. In FIG. 10, each object instance of the dog toy has been dropped, in a physics simulator, onto a pile of other dog toys from a particular height. Using the mappings between mesh vertexes and bones, the simulator can simulate the motions of the legs and head of the dog toy in a way that is far more efficient than other techniques for simulating fully deformable objects.

However, the motion of the object can be randomly simulated (e.g., while satisfying a set of DOF constraints), or otherwise simulated.

3.4. Optionally Determining a Measurement of the Object S400

Determining a measurement of the object S400 functions to determine a synthetic measurement of the object to be used as training data. S400 can be performed once, multiple times, and/or any other suitable number of times. The measurement can be one measurement, multiple measurements, and/or any other suitable number of measurements. Each measurement can depict one object instance, multiple object instances, a scene including one or more object instances, and/or any other suitable number of object instances. Each measurement can be an image, depth measurement (e.g., point cloud), video, an audio, a graph, and/or any other suitable measurement. Each measurement can additionally be associated with bounding boxes, masks, keypoints, any/or any other suitable identifiers for each object instance (e.g., determined from the simulated object model instances in S300). Each measurement can be sampled by a virtual camera, rendered, and/or otherwise determined.

In a first variant, S400 can include rendering color and texture based on the visible vertices and/or cells from a mesh (e.g., same mesh determined in S100). In a first example, pixels from the raw measurement (e.g., used to determine the mesh and/or aligned with the measurements used to determine the mesh) are projected onto corresponding vertices or cells. In a second example, the color and/or texture for each vertex (e.g., determined from the mesh in S100) is rendered at the vertex location (e.g., in the measurement). However, the color and texture can be otherwise rendered.

In a second variant, S400 can include using any other colorizing and/or texturizing technique and/or a method disclosed in U.S. application Ser. No. 17/375,331 filed on 14 Jul. 2021 and/or U.S. application Ser. No. 17/375,356 filed on 14 Jul. 2021, each of which are incorporated in their entireties by this reference.

However, the measurement can be otherwise determined.

Additionally, the method can optionally include training an object detector using the measurement. In a first example, an object detector is trained to perform instance-based segmentation using object instance identifiers as training target. In a second example, an object detector is trained to detect object keypoints using a measurement labeled with keypoints (e.g., determined from the simulated object model instance). However, the object detector can be otherwise trained.

Figure 4:
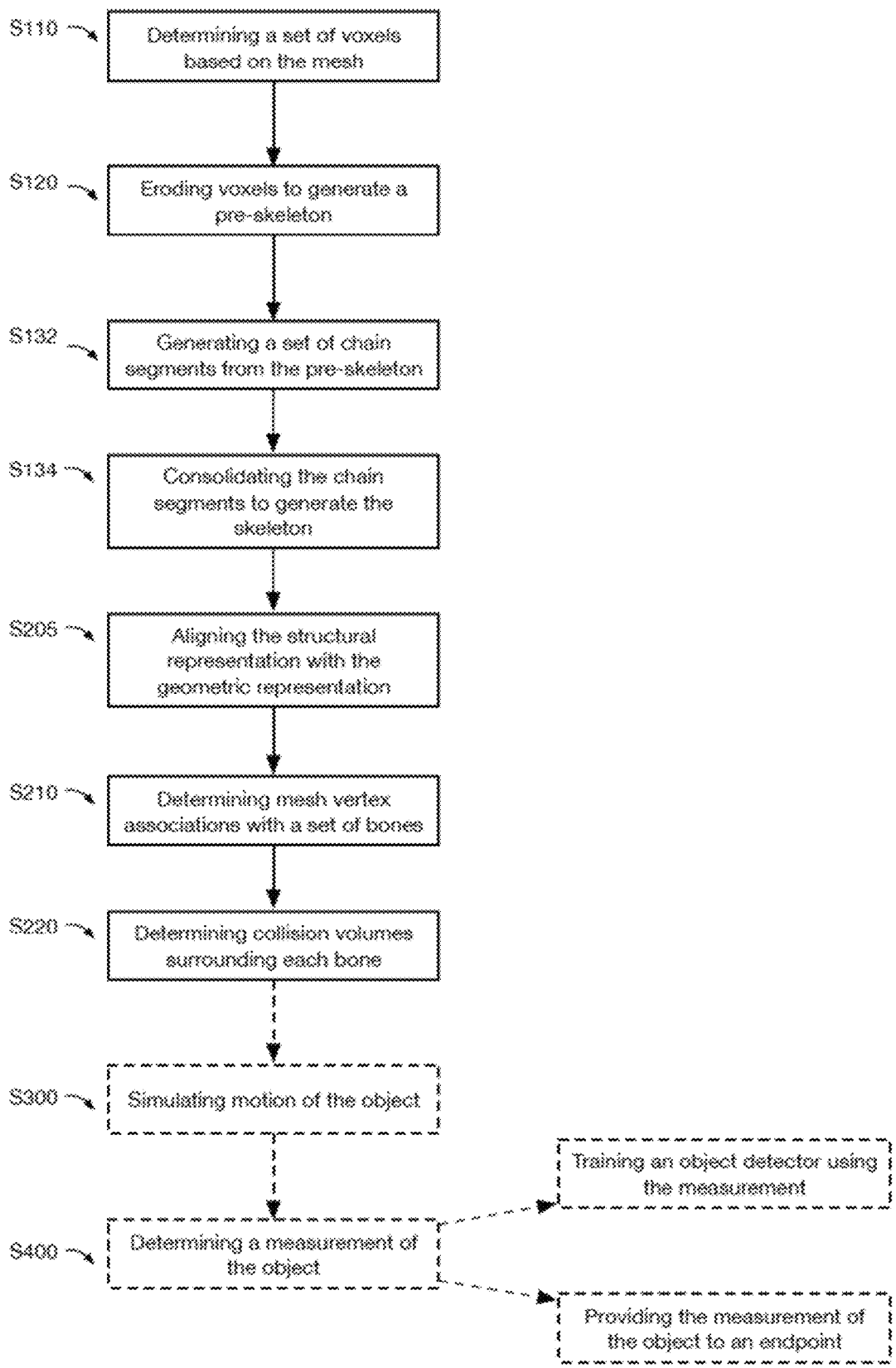
FIG. 4 is a flowchart representation of a variant of the method.

Additionally, the method can optionally include providing the measurement of the object to an endpoint; example shown in FIG. 4. Examples include: presenting the measurement on an interface, sending the measurement to an object detection model (e.g., images are used as training data for a model), storing the measurement in a database, and/or otherwise provided to an endpoint.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various elements discussed above, and/or omit one or more of the discussed elements, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:
   generating a mesh representation of a deformable object;
   generating, from the mesh representation of the deformable object, a structural representation of the deformable object;
   generating a plurality of simulated instances of the object based on kinematics of the structural representation of the deformable object;
   generating synthetic images based on the plurality of simulated instances of the deformable object; and
   training a model using the synthetic images to recognize instances of the deformable object.

2. The method of claim 1, wherein generating the structural representation comprises skeletonizing the mesh representation, including:
   converting the mesh representation into a set of voxels that fill a portion of the deformable object;
   eroding the voxels to determine a set of spatial points; and
   consolidating the spatial points.

3. The method of claim 2, wherein consolidating the spatial points comprises:
   generating edges to connect neighboring spatial points that are within a threshold distance of each other; and
   removing intermediary points.

4. The method of claim 3, wherein removing the intermediary points comprises removing points having exactly two neighboring points.

5. The method of claim 2, wherein consolidating the spatial points comprises consolidating point clusters into single points.

6. The method of claim 5, wherein point clusters are spatial points having more than a threshold number of edges.

7. The method of claim 1, wherein generating the mesh representation comprises assigning weights for one or more vertexes of the mesh to each of a plurality of bones, wherein each bone is a segment in the structural representation.

8. The method of claim 7, wherein the weights represent how much each vertex of the mesh should move with each bone.

9. The method of claim 7, further comprising interpolating weights between multiple bones.

10. A system comprising:
one or more computers and one or more storage devices storing instructions that are operable, when executed by the one or more computers, to cause the one or more computers to perform operations comprising:
generating a mesh representation of a deformable object;
generating, from the mesh representation of the deformable object, a structural representation of the deformable object;
generating a plurality of simulated instances of the object based on kinematics of the structural representation of the deformable object;
generating synthetic images based on the plurality of simulated instances of the deformable object; and
training a model using the synthetic images to recognize instances of the deformable object.

11. The system of claim 10, wherein generating the structural representation comprises skeletonizing the mesh representation, including:
converting the mesh representation into a set of voxels that fill a portion of the deformable object;
eroding the voxels to determine a set of spatial points; and
consolidating the spatial points.

12. The system of claim 11, wherein consolidating the spatial points comprises:
generating edges to connect neighboring spatial points that are within a threshold distance of each other; and
removing intermediary points.

13. The system of claim 12, wherein removing the intermediary points comprises removing points having exactly two neighboring points.

14. The system of claim 11, wherein consolidating the spatial points comprises consolidating point clusters into single points.

15. The system of claim 14, wherein point clusters are spatial points having more than a threshold number of edges.

16. The system of claim 10, wherein generating the mesh representation comprises assigning weights for one or more vertexes of the mesh to each of a plurality of bones, wherein each bone is a segment in the structural representation.

17. The system of claim 16, wherein the weights represent how much each vertex of the mesh should move with each bone.

18. The system of claim 16, further comprising interpolating weights between multiple bones.

19. One or more non-transitory computer storage media encoded with computer program instructions that when executed by one or more computers cause the one or more computers to perform operations comprising:
generating a mesh representation of a deformable object;
generating, from the mesh representation of the deformable object, a structural representation of the deformable object;
generating a plurality of simulated instances of the object based on kinematics of the structural representation of the deformable object;
generating synthetic images based on the plurality of simulated instances of the deformable object; and
training a model using the synthetic images to recognize instances of the deformable object.

20. The one or more non-transitory computer storage media of claim 19, wherein generating the structural representation comprises skeletonizing the mesh representation, including:
converting the mesh representation into a set of voxels that fill a portion of the deformable object;
eroding the voxels to determine a set of spatial points; and
consolidating the spatial points.

* * * * *